United States Patent
Kawada et al.

(10) Patent No.: US 6,837,331 B2
(45) Date of Patent: Jan. 4, 2005

(54) ELECTRIC POWER STEERING DEVICE

(75) Inventors: Hideaki Kawada, Maebashi (JP); Hisayoshi Koiwai, Maebashi (JP); Yusuke Itakura, Maebashi (JP); Yasuhiko Miyaura, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/773,892

(22) Filed: Feb. 6, 2004

(65) Prior Publication Data

US 2004/0154859 A1 Aug. 12, 2004

Related U.S. Application Data

(62) Division of application No. 10/349,894, filed on Jan. 23, 2003.

(30) Foreign Application Priority Data

| Feb. 15, 2002 | (JP) | ......... 2002-038765 |
| Mar. 8, 2002 | (JP) | ......... 2002-063622 |

(51) Int. Cl.⁷ ................................................. B62D 5/04
(52) U.S. Cl. ...................................... 180/446; 180/443
(58) Field of Search ............................... 180/402, 443, 180/446; 701/41, 43

(56) References Cited

U.S. PATENT DOCUMENTS 5,927,430 A 7/1999 Mukai et al. ............... 180/446

FOREIGN PATENT DOCUMENTS

| EP | 0 900 710 A2 | 3/1999 |
| JP | 08-091239 A | 4/1996 |
| JP | 08-091240 A | 4/1996 |
| JP | 10-194137 A | 7/1998 |

*Primary Examiner*—Lesley D. Morris
*Assistant Examiner*—Matthew Luby
(74) *Attorney, Agent, or Firm*—Sidley Austin Brown & Wood LLP (57) ABSTRACT

An electric power steering device enabled to surely detect a fault of its motor current detector circuit by avoiding the disturbance by an electrically insulated oxide film formed on the contact surface between the commutator and the brush of the motor. An ignition key is turned on, then the motor applied voltage is increased with time to break the oxide film so that the motor current flows normally. The estimated motor current is then compared with the detected motor current. When the absolute value of the difference between those estimated motor current and detected motor currents is over a predetermined limit value, it is determined that the motor current detection circuit is defective. It is also possible to break the oxide film by integrating each difference between the motor current command value and the detected motor current value, thereby increasing the current control value step by step and increase voltage applied to the motor.

6 Claims, 9 Drawing Sheets

ELECTRIC POWER STEERING DEVICE

This application is a divisional of co-pending U.S. patent application Ser. No. 10/349,894, filed Jan. 23, 2003, which is based on Applications Nos. 2002-038765, and 2002-063622, filed in Japan, the contents of which are hereby incorporated by reference.

BACKGROUND OF THE INVENTION

1. Field of the Invention

The present invention relates to an electric power steering device for motor vehicles. More particularly, the present invention relates to an electric power steering device that can detect faults to occur in the motor current detecting means.

2. Prior Art

An electric power steering device employed for a motor vehicle detects a steering torque generated at a steering shaft by an operation of the steering wheel and a speed of the motor vehicle and drives the motor according to detected signals, thereby assisting the steering power of the steering wheel. An electronic control circuit is used to control such an electric power steering device as follows: a value of a current to be supplied to the motor is calculated based on the steering torque detected by a torque sensor and the vehicle speed detected by a vehicle speed sensor and the supply current is controlled based on the calculation result.

Concretely, the electronic control circuit controls the supply current so that a large assist steering power is supplied to the steering wheel when the steering torque is generated by an operation of the steering wheel and the detected vehicle speed is zero or low, and a small assist steering power is supplied to the steering wheel when the speed of the motor vehicle is high, thereby optimizing the supply of the assist steering power in accordance with the running state of the motor vehicle.

In such an electric power steering device, the actual current that flows in the motor is fed back and controlled so that the current matches with the target value calculated based on the steering torque and the vehicle speed. The electric power steering device is thus provided with a motor current detecting means for detecting the current that flows in the motor.

In such an electric power steering device, if the motor current detecting means breaks down, accurate motor current measurement is disabled and accordingly, an excessive current flows in the motor. As a result, an excessive assist steering power is supplied to the steering wheel or a sufficient current is not supplied to the motor. The assist steering power to be supplied to the steering wheel will thus become insufficient.

Furthermore, an operation check is usually done for the controlling device of the motor vehicle at the engine start-up time. An operation check is also done for the motor current detecting means at this time. And, when a current is supplied to the motor in the operation check, the motor rotates. If the motor shaft is coupled with the steering mechanism at this time, the steering wheel also rotates, thereby an unexpected accident might occur.

To avoid such an accident, Japanese Patent Laid Open Publication No. H8-91239 (91239/1996) proposes the use of a fault determining means. According to the invention, a fault to occur in the motor current detecting means is determined based on a current value expected when a voltage is applied to the motor only for a short time assumed to be larger than the electrical time constant and smaller than the mechanical time constant of the motor, and a motor current detected by the motor current detecting means itself.

The fault determining means of the above-described motor current detecting means determines a fault based on a voltage applied to the motor only for a short time just after the engine is started up by turning on the ignition key, that is, only for a time whose value is larger enough than the electrical time constant and smaller enough than the mechanical time constant of the motor. This is needed to prevent the above described unexpected accident to be caused by an unexpected rotation of the steering wheel when the motor begins rotating just after the engine starts.

The motor, when it is kept used for a certain time, causes an electrically insulated oxide film to be formed on contact surfaces between the commutator and the brush of the motor. The oxide film becomes thicker with time, thereby the electric resistance between the contact surfaces rises. To apply a higher voltage is thus required to rotate the motor in this connection.

Figure 9A:
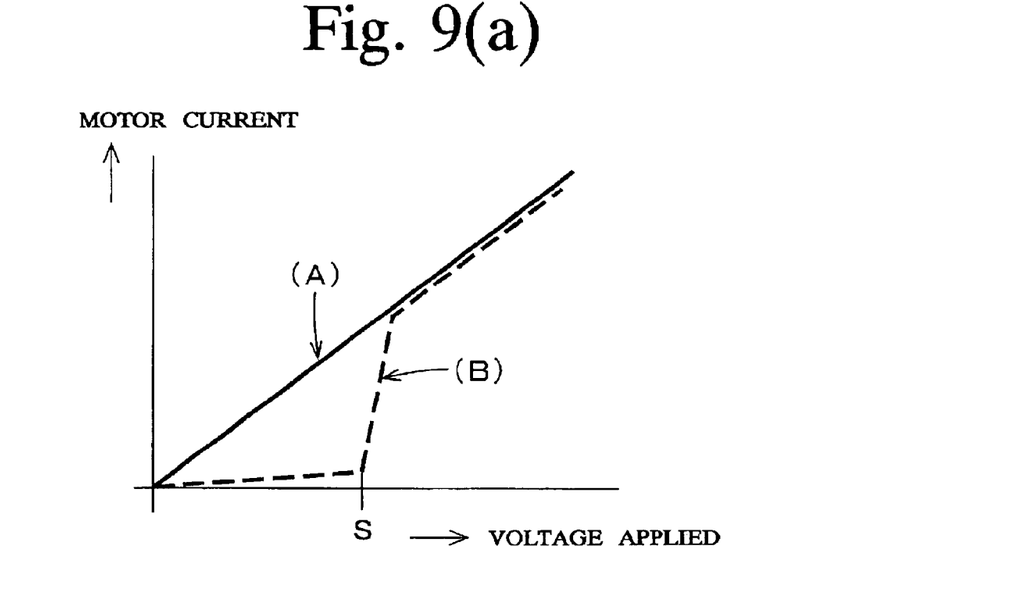
FIG. 9(a) and FIG. 9(b) are diagrams showing the disturbance by an oxide film formed on the contact surface between the commutator and the brush of the motor against motor current measurement.
Figure 9B:
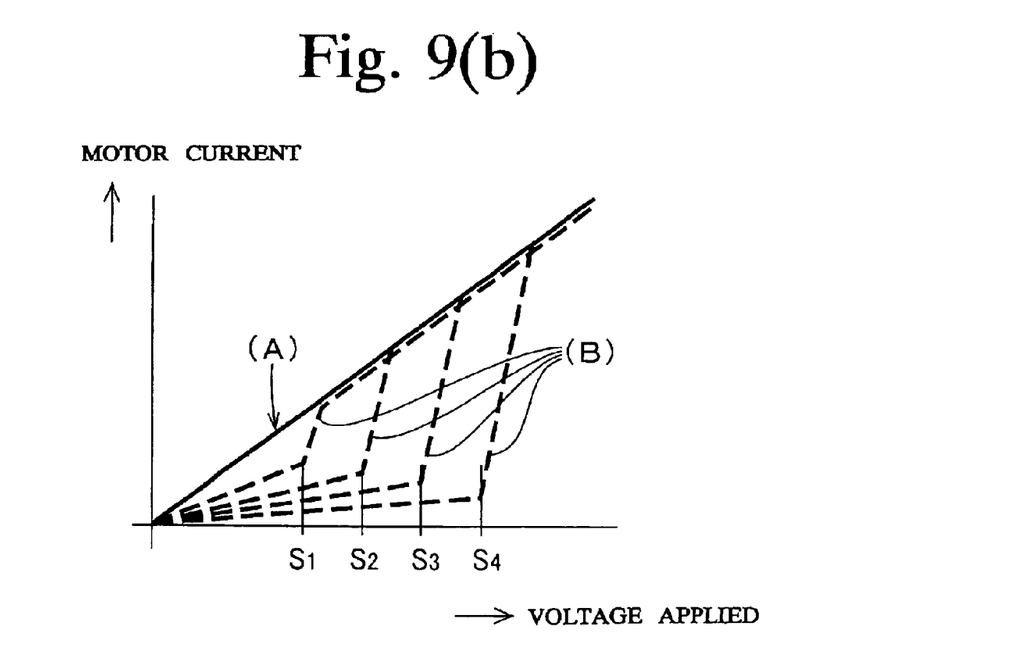

FIGS. 9(a) and 9(b) are diagrams showing the disturbance by such an oxide film against motor current measurement. As to be understood from FIG. 9(a), a line A denotes the normal state of the motor, in which no oxide film is formed on the contact surface, since the motor is new. The applied voltage and current of the motor are in a proportional relationship with each other. The motor current increases in proportion to the rising of the applied voltage. Another line B shows a case in which an oxide film is formed on the contact surfaces. The motor current does not increase in proportion to the rising of the applied voltage in this case. When the applied voltage reaches the value S, however, the oxide film causes breakdown (puncture), thereby the electric resistance of the film drops sharply. Consequently, a current corresponding to the normal voltage comes to flow in the motor.

FIG. 9(b) shows how the applied voltage that causes breakdown of the oxide film rises. When the oxide film becomes thicker with time, applied voltage that causes breakdown of the oxide film will be raised up S1, S2, S3 and S4 with time.

As described above, application of a low voltage to the motor only for a short time might cause a problem in determination of a fault in the motor current detecting means since the motor current is not detected or only a few motor current is detected due to the oxide film formed on the contact surface. It might thus be determined wrongly that the motor current detecting means is defective.

SUMMARY OF THE INVENTION

1. It is an object of the present invention to provide an electric power steering device that enables sure detection of faults to occur in the motor current detecting means free from the disturbance by the electrically insulated oxide film to be formed on the contact surface between the commutator and the brush of the motor for assisting the steering torque in an operation check for the electronic control circuit performed just after the device engine starts up.

2. It is another object of the present invention to provide an electric power steering device that enables sure detection of faults to occur in the motor current detecting means free from the disturbance by the electrically insulated oxide film formed on the contact surface between the commutator and the brush of the motor for assisting the steering torque by increasing the voltage applied to the motor in an operation check of the electronic control circuit performed just after the device engine is started.

3. It is still another object of the present invention to provide an electric power steering device that enable sure detection of faults to occur in the motor current detecting means by increasing the voltage applied to the motor for assisting the steering torque step by step with time, thereby breaking the electrically insulated oxide film formed on the contact surface between the commutator and the brush of the motor.

4. It is still another object of the present invention to provide an electric power steering device that enables sure detection of faults to occur in the motor current detecting means by increasing the voltage applied to the motor for assisting the steering torque step by step with time according to a difference integrated value between a current command value for the motor and the detected motor current, thereby breaking the electrically insulated oxide film formed on the contact surface between the commutator and the brush of the motor.

5. These and other objects of the present invention will become more apparent upon a reading of the following detailed descriptions and drawings.

DETAILED DESCRIPTION OF THE PREFERRED EMBODIMENTS

Hereunder, the preferred embodiments of the present invention will be described with reference to the accompanying drawings.

[First Embodiment]

Figure 1:
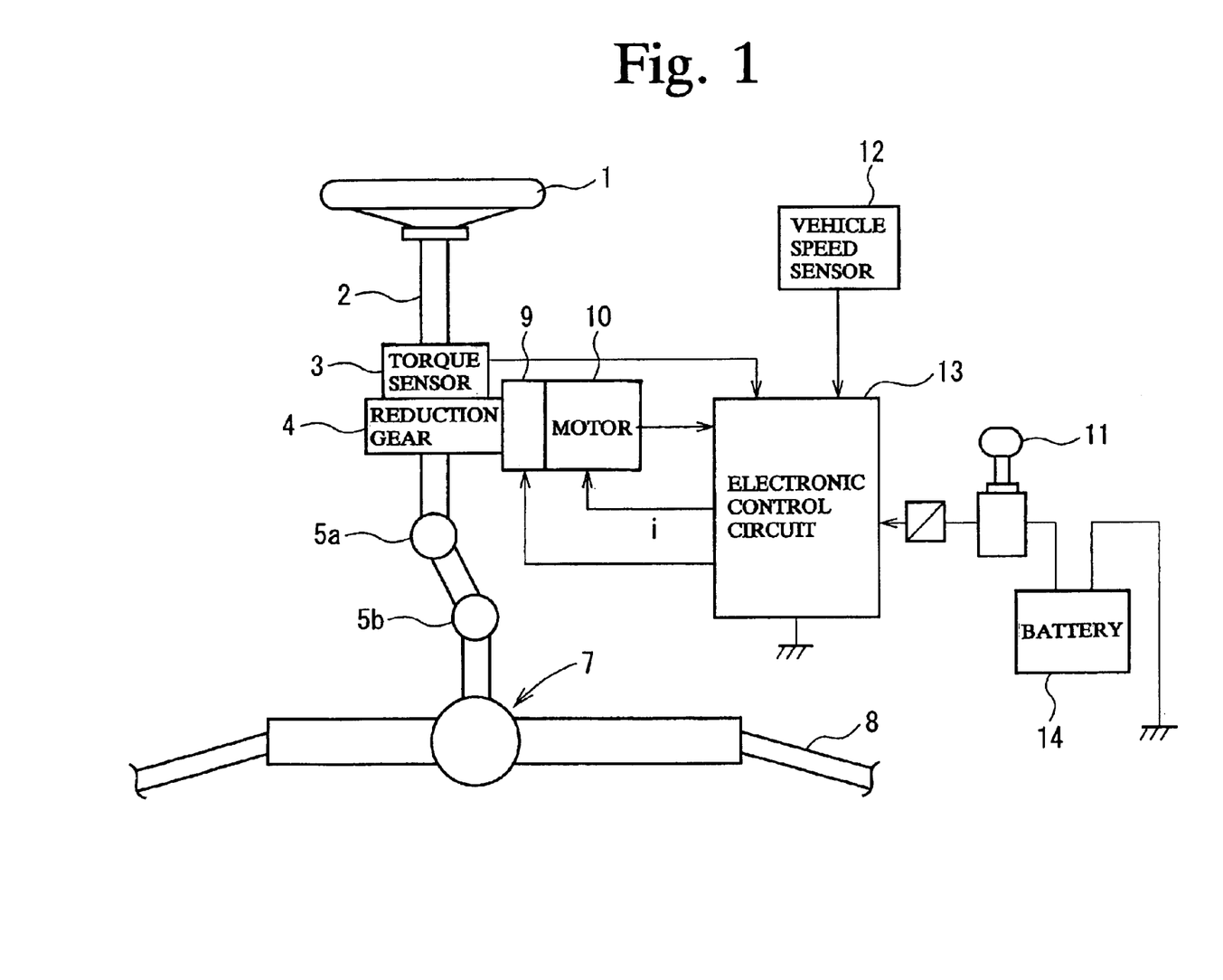
FIG. 1 is a schematic block diagram of an electric power steering device in the first embodiment of the present invention.

The first embodiment of the present invention will be described. FIG. 1 shows a schematic block diagram of an electric power steering device in the first embodiment of the present invention. A shaft 2 of a steering wheel 1 is connected to a tie rod 8 of a wheel through a reduction gear 4, universal joints 5a and 5b, and a pinion rack mechanism 7. The shaft 2 is equipped with a torque sensor 3 for detecting a steering torque of the steering shaft 2. A motor 10 for assisting the steering power is connected to the shaft 2 through a clutch 9 and the reduction gear 4.

An electronic control circuit 13 for controlling the electric power steering device receives a power from a battery 14 through an ignition key 11. The electronic control circuit 13 calculates a current command value according to the steering torque detected by the torque sensor 3 and the vehicle speed detected by the vehicle speed sensor 12 to control the current i supplied to the motor 10 based on the calculated current command value.

The clutch 9 is controlled by the electronic control circuit 13. The clutch 9 is engaged with the reduction gear 4 in the normal state and disengaged from the reduction gear 4 when it is determined that the electric power steering device is defective or when the power is turned off.

Figure 2:
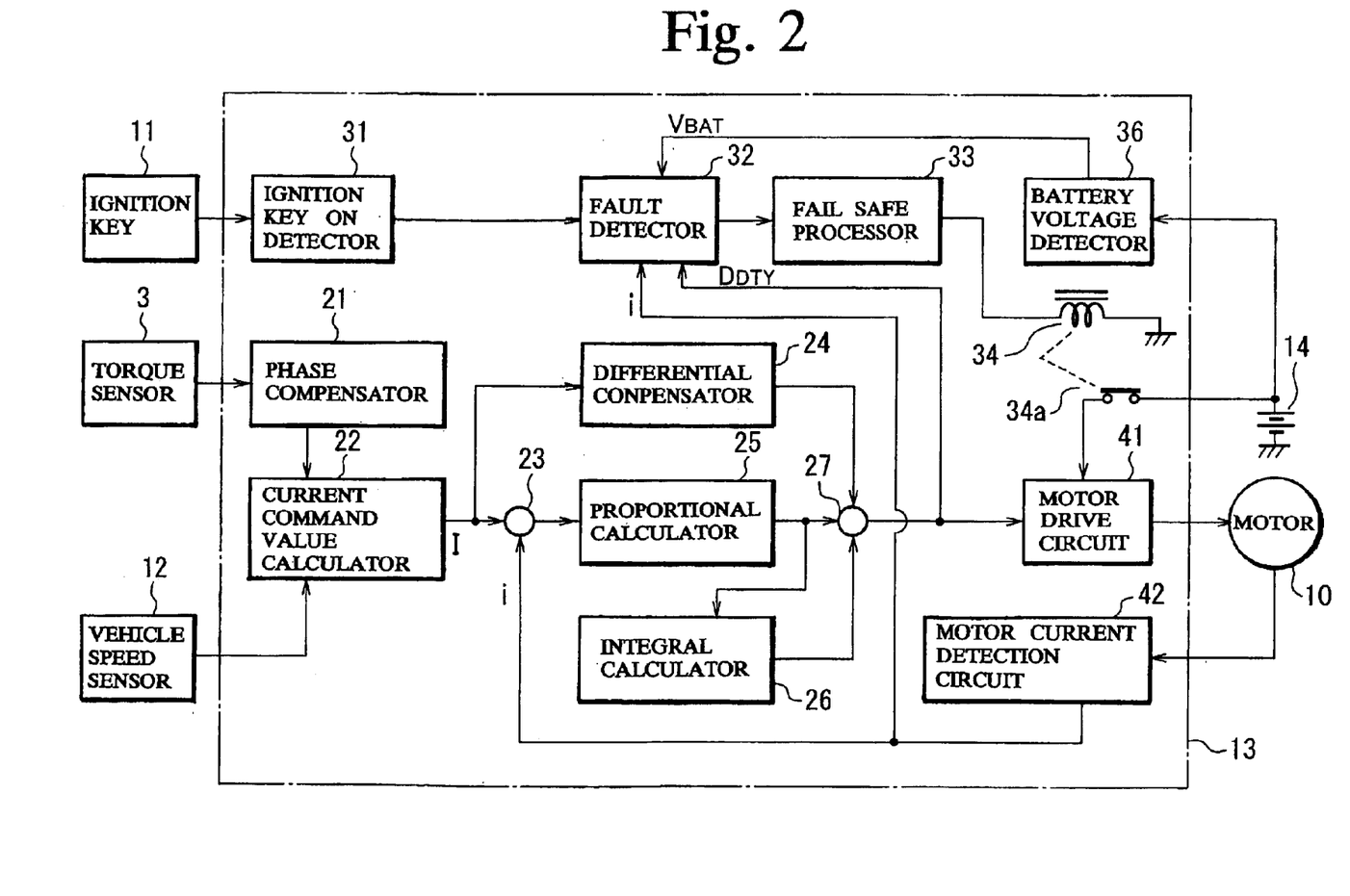
FIG. 2 is a block diagram of an electronic control circuit in the first embodiment of the present invention.

FIG. 2 shows a block diagram of the electronic control circuit 13. In this first embodiment, elements in the electronic control circuit 13 that is mainly configured by a CPU are shown as functions to be executed by a program stored in the CPU. For example, a phase compensator 21 is not shown as an independent hardware unit here; it is shown as a function of phase compensation executed in the CPU. The electronic control circuit 13 may not be configured by the CPU and each of the above functions may be configured by independent hardware units (electronic circuit), of course.

Next, the functions and operations of the electronic control circuit 13 will be described. A steering torque signal inputted from the torque sensor 3 is subjected to phase compensation in the phase compensator 21 so as to improve the steering system stability. The signal is then inputted to a current command value calculator 22. The vehicle speed detected by the vehicle speed sensor 12 is also inputted to the current command value calculator 22.

The current command value calculator 22 calculates a current command value I with use of a predetermined expression based on the torque signal and the vehicle speed received respectively as described above. The current command value I is a target control value of the current to be supplied to the motor 10.

A circuit comprising a comparator 23, a differential compensator 24, a proportional calculator 25, and an integral calculator 26 is used for executing feedback control so as to make actual motor current value i match with the current command value I.

The proportional calculator 25 outputs a proportion value that is proportional to a difference between the current command value I and the actual motor current value i. The output signal of the proportional calculator 25 is integrated in the integral calculator 26 to improve the feed-back system characteristics, then output as a proportion value of the integrated difference value.

The differential compensator 24 outputs a differentiated value of the current command value I to improve the response characteristics of the motor current value i that actually flows in the motor, with respect to the current command value I calculated by the current command value calculation part 22.

The differentiated value of the current command value I output from the differential compensator 24, the proportion value proportional to the difference between the current command value I and the actual current value i output from the proportional calculator 25, and the integrated value output from the integral calculator 26 are added up in the adder 27 and the result of current control value (the duty ratio of the PWM signal determining a voltage to be applied to the motor) is output to the motor drive circuit 41 as a motor drive signal.

Figure 3:
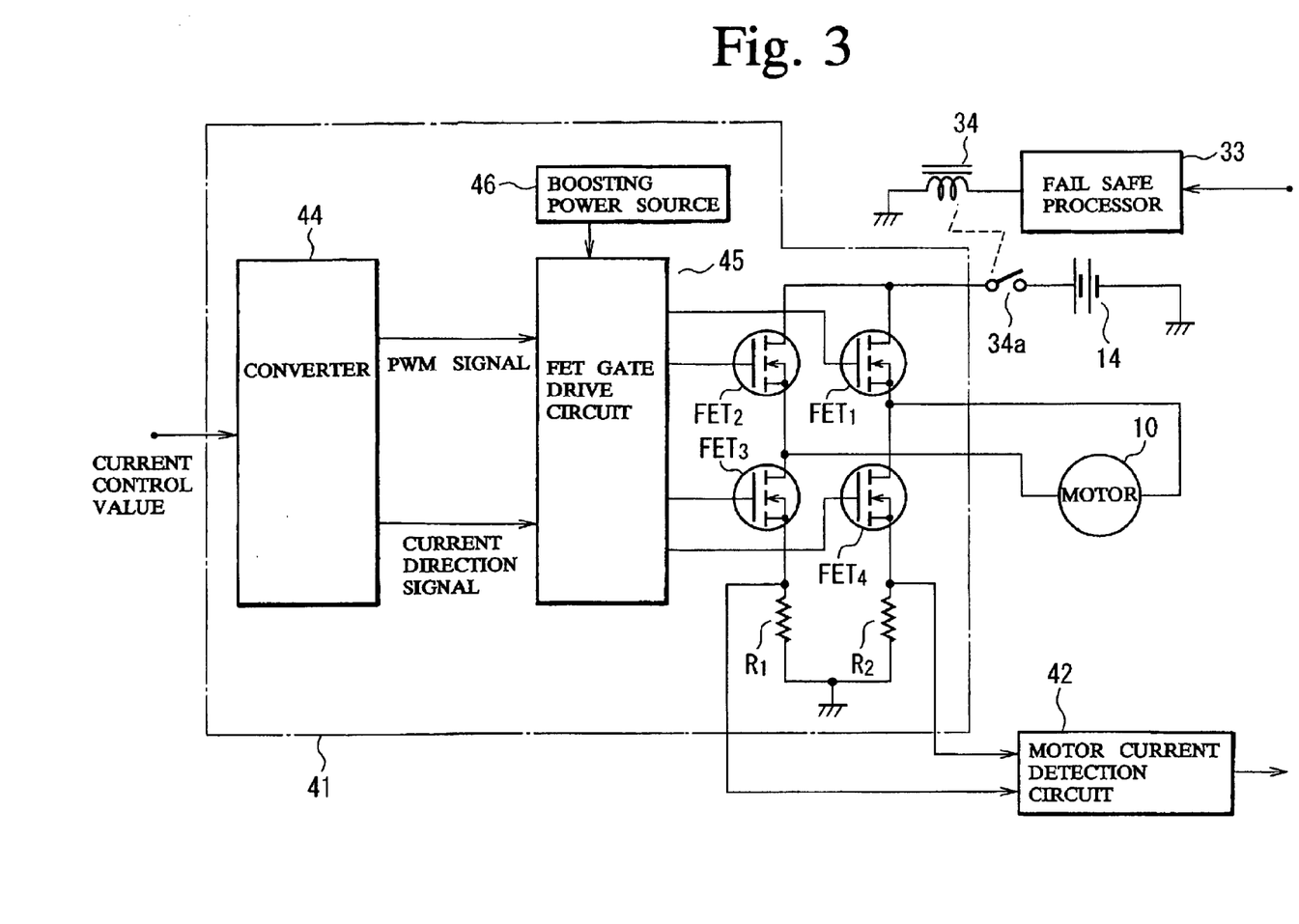
FIG. 3 is a block diagram of a motor drive circuit.

FIG. 3 shows a block diagram of the motor drive circuit 41. The motor drive circuit 41 is configured mainly by a converter 44 for converting a current control value inputted from the adder 27 to a PWM signal and a current direction signal separately, switching elements FET1 to FET4 (field effect transisitors), a FET gate drive circuit 45 for opening/closing the gates of those switching elements. The boosting power source 46 is used for driving the high side of each of the gates FET1 and FET2.

The PWM signal (pulse width modulation signal) drives the gates of the switching elements FET1 to FET2 of the H-bridge connected FETs. The PWM signal is also used to determine a duty ratio (a time ratio to turn on/off the FET gates) based on the absolute current control value calculated by the adder 27.

The current direction signal denotes a direction of the motor current. This signal is determined by the positive/negative sign of the corresponding current control value calculated by the adder 27.

As described above, both FET1 and FET2 are switching elements, each having a gate to be turned on/off based on the duty ratio of the PWM signal. Those FET1 and FET2 are used to control the size of the motor current. Both FET3 and FET4 are also switching elements, each having a gate to be turned on/off based on the current direction signal. (When one of the FET3 and FET4 is turned on, the other is turned off.) They (FET3 and FET4) are used to switch the motor current direction, that is, the motor rotating direction.

When the FET3 is conductive, the current flows towards the motor 10 in the positive direction through the FET1, the motor 10, the FET3, and the resistor R1. When the FET4 is conductive, the current flows toward the motor 10 in the negative direction through the FET2, the motor 10, the FET4, and the resistor R2.

The motor current detection circuit 42 detects the value of the current in the positive direction based on the voltage that drops at both ends of the resistor R1 and detects the value of the current in the negative direction based on the voltage that drops at both ends of the resistor R2. The detected actual motor current value is fed back to the comparator 23 (see FIG. 2).

The electronic control circuit described above sets a large current command value I when detected steering torque is large or the detected vehicle speed is zero or low. When the detected steering torque is small or the detected vehicle speed is high, the control circuit sets a small current command value I. The steering power is thus assisted optimally according to the running state of the subject motor vehicle.

Next, an explanation will be made for how a fault is detected in the motor current detecting means and the fail-safe processing to be performed according to the detection result.

At first, the principles of the fault detection and the fail-safe processing will be described. When the ignition key 11 is turned on to apply a voltage V to the motor, a relationship in the following expression (1) is established between the voltage V that flows between motor terminals and the current i that flows in the motor.

$$V = L\,di/dt + Ri + k_T\omega \quad (1)$$

Here, the $k_T$ denotes a counter electromotive force constant and the $\omega$ denotes a motor angular speed, the L denotes a motor inductance, and the R denotes an inter-terminal resistance of the motor.

The mechanical time constant Tm of the motor is obtained by dividing the inertia moment J of the motor by the viscosity resistance B of the motor and represented as Tm=J/B. The electrical time constant Te of the motor is obtained by dividing the inductance L of the motor by the resistance R of the motor and represented as Te=L/R.

FIG. 4 shows the transient characteristics of the motor current i and the motor angular velocity $\omega$, as well as a timing for sampling the motor current when the time T is set smaller enough than the mechanical time constant Tm of the motor and larger enough then the electrical time constant Te of the motor (Te<<T<<Tm) and a voltage V is applied to the motor just for a time between the initial state and the time T.

Figure 4A:
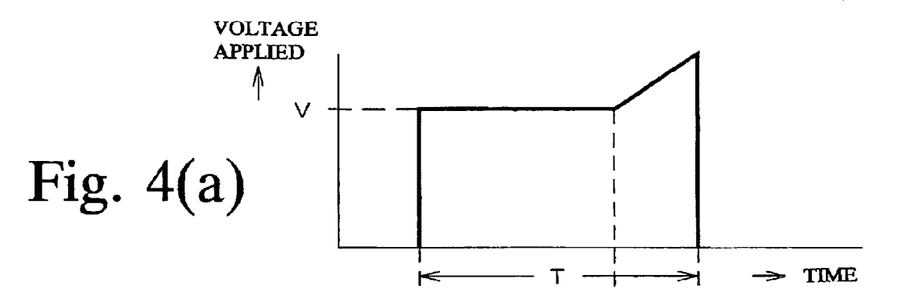
FIGS. 4(a), 4(b), 4(c) and 4(d) are diagrams showing the transient characteristics of a motor current i and a motor angular velocity ω, as well as a timing for sampling the motor current i.

FIG. 4(a) shows a relationship between the voltage V applied to the motor and the application time. A certain voltage V0 is applied to the motor until the time T0 before the motor current sampling begins. When the sampling begins, the duty ratio changes, thereby the voltage V applied to the motor changes with time.

Figure 4B:
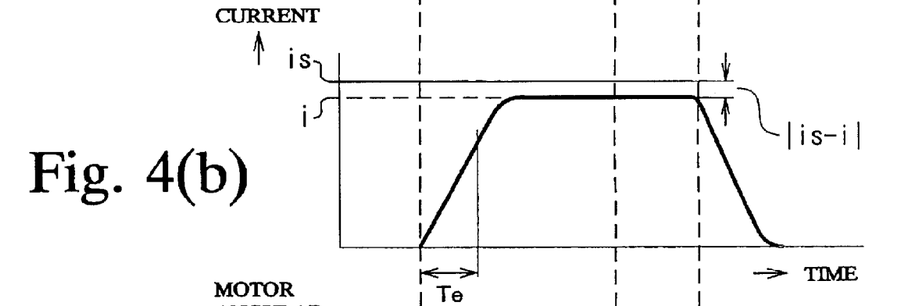

FIG. 4(b) shows a relationship between the motor current and the application time. As shown in FIG. 4(b), when the voltage V is applied to the motor, the motor current i rises quickly (the electrical time constant Te<<applied time T of the voltage V) and the constant current i flows in the motor. The "is" denotes an estimated motor current value (to be described later).

Figure 4C:
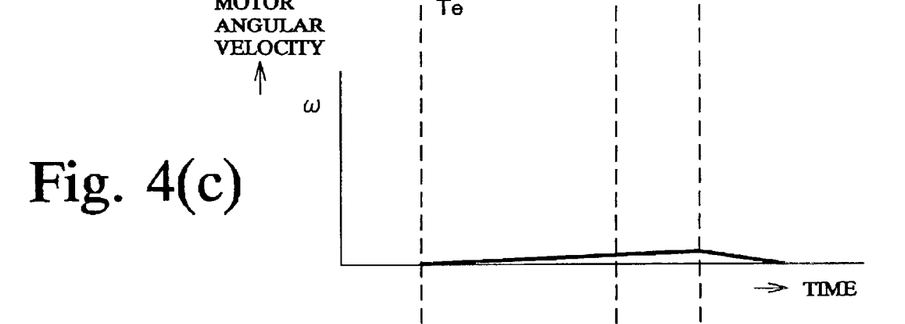

FIG. 4(c) shows a relationship between the angular velocity $\omega$ of the motor and the application time. As shown in FIG. 4(c), the mechanical time constant Tm of the motor is large and the angular velocity $\omega$ of the motor is almost zero, that is, the motor does not rotate for the time T in which the voltage V is applied to the motor. In this connection, when the voltage V to be applied to the motor is determined so that the estimated motor current "is" is set lower than the value corresponding to the static friction torque of the steering mechanism, the condition that the motor does not rotate unexpectedly is satisfied.

Figure 4D:
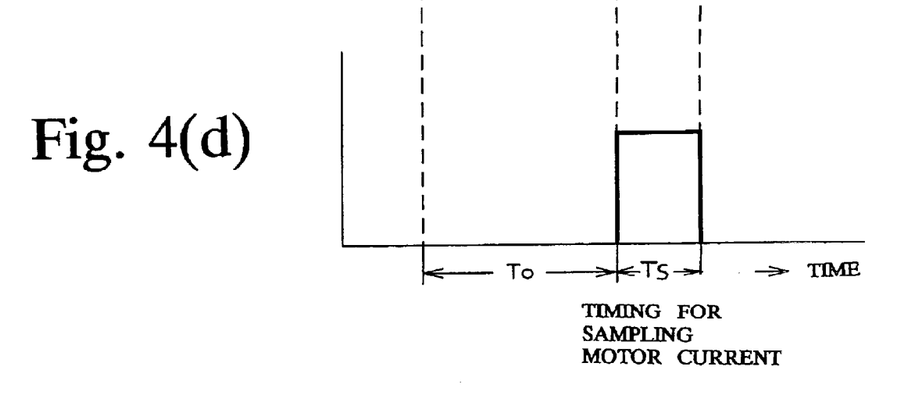

FIG. 4(d) shows a timing for sampling the motor current. As shown in FIG. 4(d), the sampling begins at the time T0 after the voltage V is applied to the motor.

According to the transient characteristics of the motor current i and the motor angular velocity $\omega$, the motor current rises when the time T0 is up, then the voltage V is applied to the motor. The time T0 is a little earlier than the time T. And, because the motor hardly rotates while the constant current i flows in the motor, the angular velocity ($\omega$ and the differentiated value of the motor current i becomes approximately zero.

Consequently, the above expression (1) can be replaced with the following expression (2).

$$V = Ri \quad (2)$$

The estimated motor current "is" is thus obtained by dividing the voltage V between motor terminals by the internal resistance R and represented by the following expression (3).

$$is = V/R \quad (3)$$

As to be understood from the expression (3), the estimated motor current "is" does not include any of the counter-electromotive force $k_T\omega$ and the regenerative voltage $L \cdot di/dt$ item of the motor, so that the motor current "is" can be estimated free from the disturbance by the counter electromotive force and the regenerative voltage of the motor.

The voltage applied to the motor may be detected directly from the voltage V between motor terminals or as follows.

The voltage V between motor terminals is related to the current control value (the duty ratio of the PWM signal) supplied to the motor as shown in the following expression (4).

$$V = V_{BAT} \cdot D \quad (4)$$

Here, the $V_{BAT}$ denotes a battery voltage and the D denotes a duty ratio of the PWM signal.

Consequently, the expression (3) for representing the estimated motor current "is" can be replaced with the following expression (5).

$$is = (V_{BAT} \cdot D)/R \qquad (5)$$

Hereinafter, a description will be made for both configuration and operation of the fault determination of the motor current detecting means and the fail-safe processing with reference to FIG. 2.

When the ignition key 11 is turned on, a voltage is applied to the motor only for a predetermined time T preset in a timer TM (not shown). The on-state of the ignition key 11 is detected by the ignition key ON detector 31 and the detected signal is inputted to the fault detector 32. The fault detector 32 also receives a battery voltage $V_{BAT}$ detected by the battery voltage detector 36 and a current control value (duty ratio D of the PWM signal), which is an input signal of the motor drive circuit.

Furthermore, sampling of the motor current i begins at the predetermined time T0 (T0<T) preset in the timer TM (not shown) and the motor current value i detected by the motor current detection circuit 42 is inputted to the fault detector 32. The sampling is performed just for the predetermined time $T_s$ preset in the timer TM.

The fault detector 32 calculates an estimated current value "is" by substituting the battery voltage value $V_{BAT}$, the duty ratio D of PWM signal, and the resistance R between motor terminals for the expression (5), then compares the result of calculated current value "is" with the motor current value "i" detected by the motor current detection circuit 42 as a sampling value. As a result, when the difference of absolute value |is−i| is larger than a predetermined allowable value Δi, it is determined that the motor current detection circuit 42 is defective.

When it is determined that the motor current detection circuit 42 is defective, the fail-safe processor 33 is actuated to turn off a fail relay 34 and open a contact 34a so that power supply to the motor 10 is shut off and the electric power steering device is set in no-operation condition.

The fault determination for the motor current detection circuit 42 might be taken as a real fault or wrong fault. The wrong fault is caused by that the contact surface between the commutator and the brush of the motor is covered by an oxide film, thereby no motor current is detected or only a slight motor current is detected.

In order to prevent such a wrong fault determination, a voltage between motor terminals, that is, a voltage applied to the motor is increased step by step with time to break the oxide film, thereby eliminating the disturbance by the oxide film against the motor current detection. After this, the motor current i is detected to determine whether or not the motor current detection circuit 42 is defective. Hereinafter, the configuration of the electric power steering device required for this processing will be described.

As shown in the expression (4), the voltage between motor terminals, that is, the voltage V applied to the motor is determined by the duty ratio D of PWM signal and the battery voltage value $V_{BAT}$. Thus, the voltage between motor terminals, that is, the voltage V applied to the motor can be changed by changing the duty ratio D.

Here, a description will be made for two methods for changing the duty ratio D of PWM signal to change the motor applied voltage V: one method changes the duty ratio D with time in one sampling operation and the other method changes the duty ratio D based on the number of time for sampling done by a plurality of sampling operation.

Figure 5A:
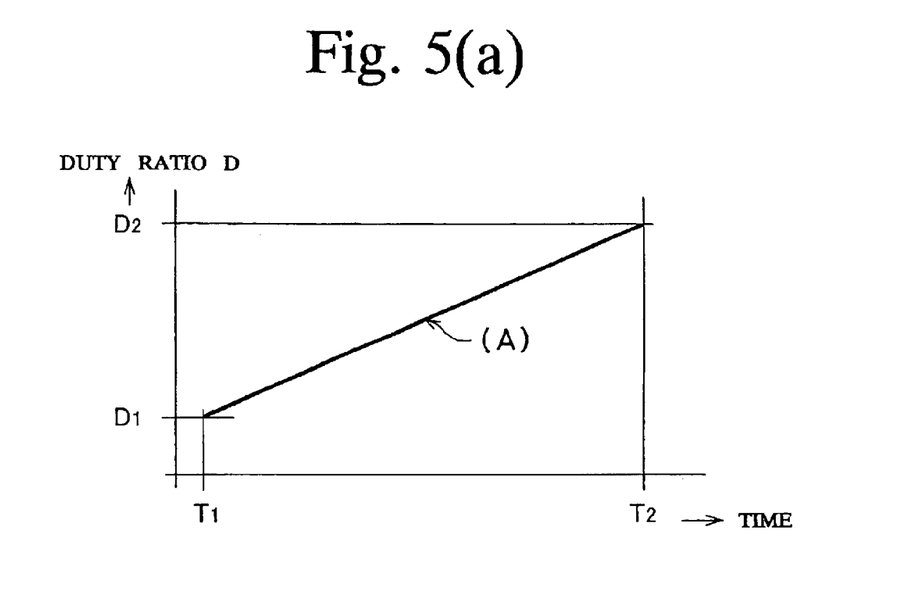
FIGS. 5(a) and 5(b) are diagrams showing how to change a duty ratio D with time in a sampling operation.
Figure 5B:
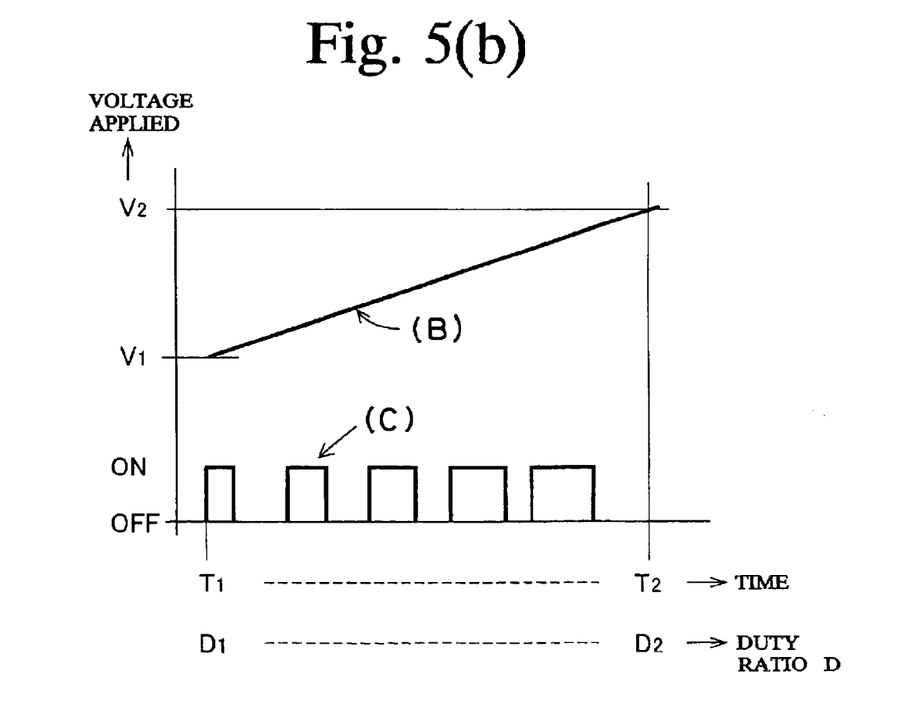

FIG. 5(a) and FIG. 5(b) show diagrams for describing a method for changing the duty ratio D with time during the one sampling operation. As shown in FIG. 5(a), the duty ratio D is changed from D1 to D2 in the sampling operation between the times T1 and T2 as shown in line A. The voltage V applied to the motor at this time is changed in proportion to the increase of the duty ratio D as shown in FIG. 5(b) as follows; the on-time of the voltage V applied to the motor becomes longer gradually as shown in line C, and accordingly the average value of the voltage V increases from V1 to V2 gradually as shown in line B.

Figure 6A:
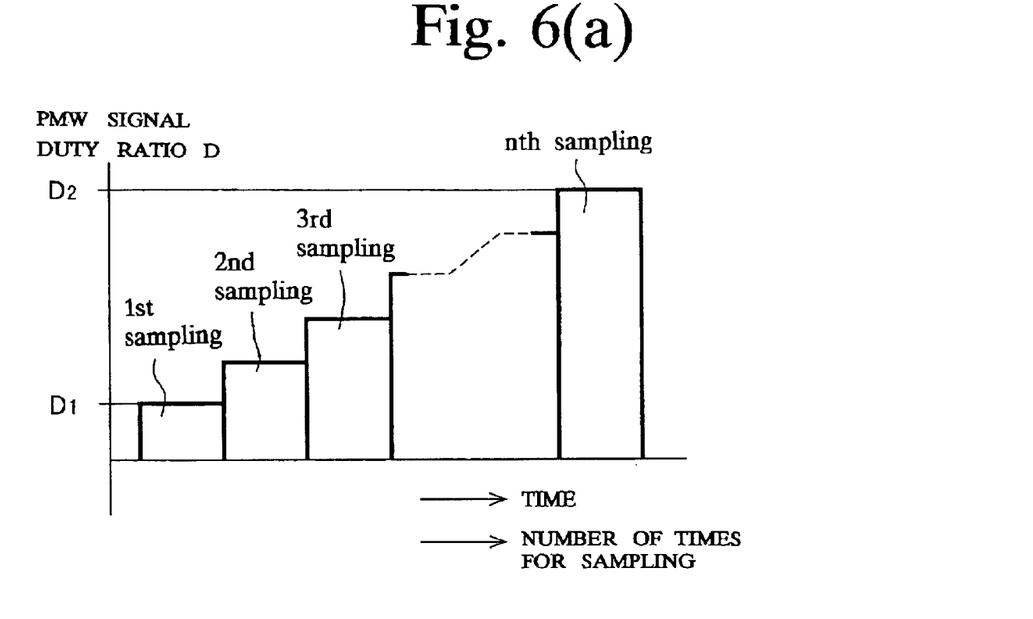
FIGS. 6(a) and 6(b) are diagrams showing how to change the duty ratio D with time in a plurality of sampling operations.
Figure 6B:
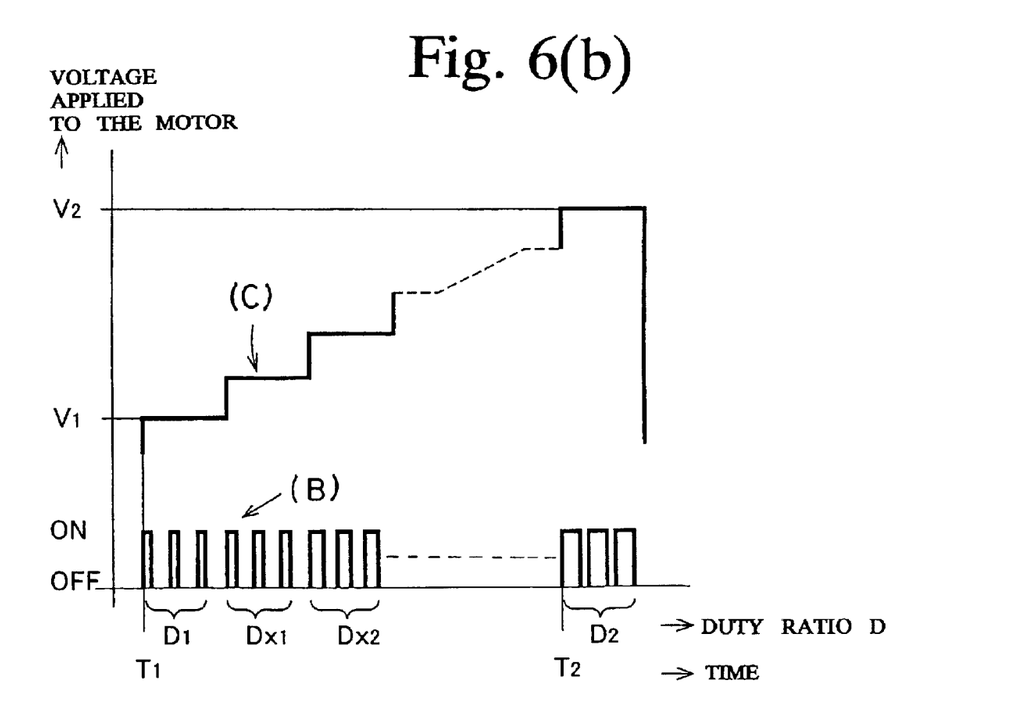

FIG. 6(a) and FIG. 6(b) show diagrams for describing a method for changing the duty ratio D with time in a plurality of sampling operations. As shown in FIG. 6(a), the duty ratio, which is D1 in the first sampling operation, rises more and more in the subsequent sampling operation. In the (n)-th sampling operation, the duty ratio D becomes D2. The duty ratio is assumed to be fixed in each one sampling operation in this case as shown in FIG. 6(b), line B. The voltage V applied to the motor at this time extends its on-time longer and longer in the subsequent sampling operation. As a result, the average value of the voltage V applied to the motor changes gradually from V1 to V2 as shown in FIG. 6(b), line C.

Duty ratio D1 is the minimum duty ratio, which corresponds to the minimum necessary voltage V for breaking an oxide film as described above. Duty ratio D2 is the maximum duty ratio, which corresponds to the maximum voltage V applied to the motor just before the motor rotates, thereby the steering wheel begins rotating.

Any of the above methods can be selected for changing the duty ratio D to increase the voltage V applied to the motor.

Figure 7:
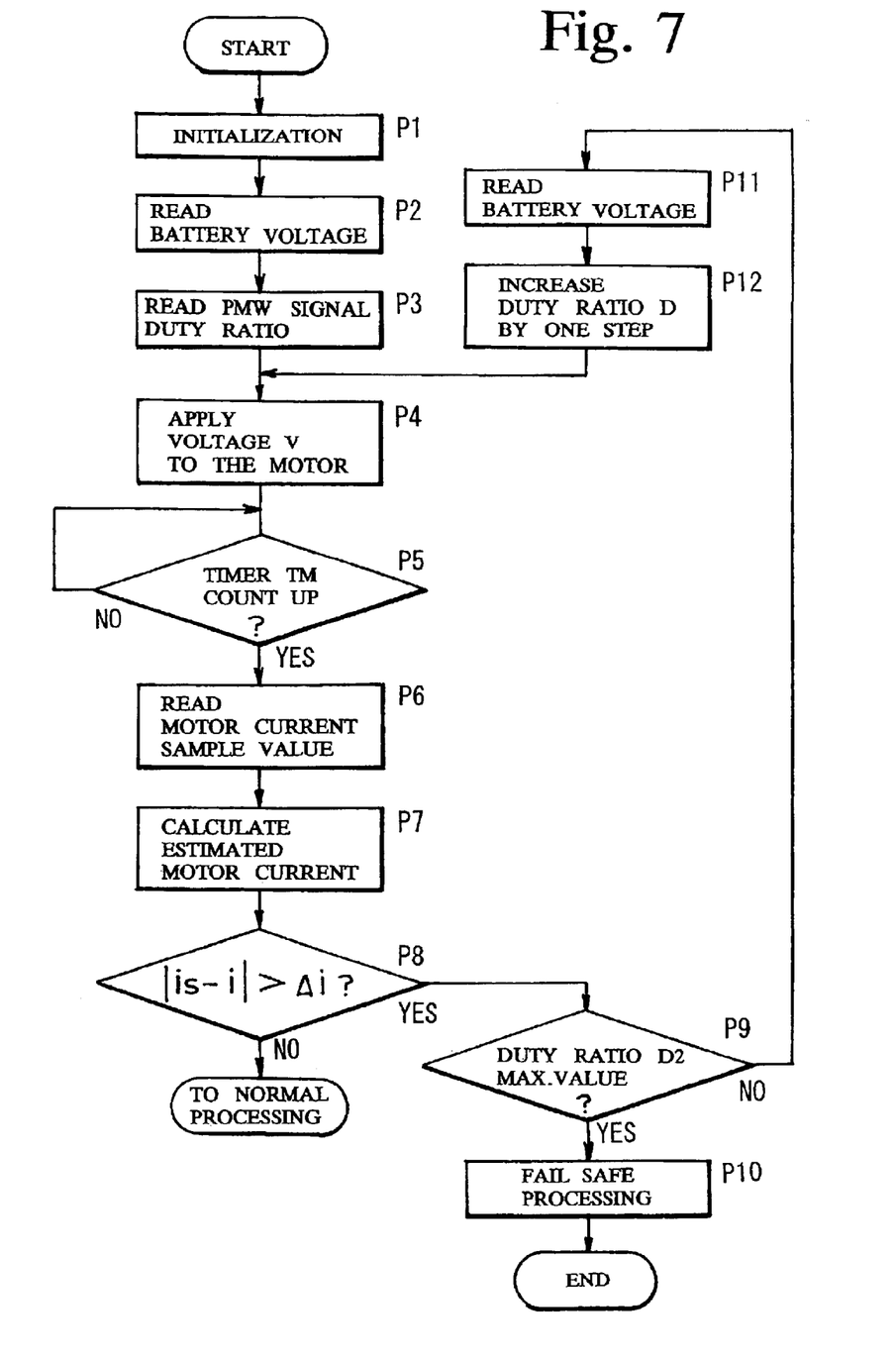
FIG. 7 is a flowchart of the controlling operations performed by the electronic control circuit.

FIG. 7 shows a flowchart for controlling the operation of the fault detector 32 when the method for changing the duty ratio D based on the number of times of sampling done by a plurality of sampling operations.

At first, the fault detector 32 is initialized, and the timer TM is started (step P1). Then, the battery voltage value $V_{BAT}$ and the PWM signal duty ratio D are read sequentially (steps P2 and P3). It is assumed here that D1 (the minimum duty ratio) is set as the initial duty ratio D, after that it is updated when duty ratio is changed.

The voltage V corresponding to the set duty ratio D is applied to between terminals of the motor (step P4). When the predetermined time T0 preset in the timer TM is up (step P5), the motor current sampled value i is read from the motor current detection circuit 42 (step P6). The estimated motor current "is" is calculated by the expression (5) (step P7) to determine whether or not the absolute value |is−i| is larger than the predetermined allowable value Δi (step P8). When the result in step P8 is NO (not larger), it is determined that no fault has occurred, thereby control goes to the normal processing.

When the result in step P8 is YES (larger), the duty ratio D is changed to break the oxide film, since the motor current detector might be defective and/or an oxide film is formed on the contact surface between the commutator and the brush of the motor, thereby the motor current might not be detected accurately. It is determined whether or not the set duty ratio is D2 (maximum value) (step P9). When the result is YES (D2), it is estimated that the oxide film is already broken. Consequently, it is determined that the motor current detection circuit 42 is defective and the fail-safe processing is performed while the duty ratio D2 is kept as is (step P10), then the processing is terminated.

When the result in step P9 is NO (not D2), the battery voltage $V_{BAT}$ is read, then the duty ratio D is increased by one step (steps P11 and P12). After that, program controlling is jumped to step P4.

A voltage value corresponding to the mechanical time constant Tm of the motor is assumed as the upper limit for the voltage V applied to the motor for preventing the motor rotation in the fault detection processing.

As described above, in the first embodiment, the motor current detecting circuit is checked for faults just after the ignition key is turned on. The fault is detected by comparing the estimated motor current value based on the motor current command value with the actual motor current value detected by the motor current detection circuit while the motor current command value is set only for a time T whose value is smaller enough than the mechanical time constant Tm and larger enough than the electrical time constant Te of the motor (Te<<T<<Tm) and the current control value is changed with time. The method thus makes it possible to determine faults of the motor current detecting circuit while the motor does not rotate.

Furthermore, the motor current detection circuit is also checked for faults while a current flows in the motor only for a short time. However, the fault that is detected at this time might not be a real one. This is because a similar fault is often detected when an oxide film is formed on the contact surface between the commutator and the brush of the motor, thereby the motor current cannot be detected accurately. In this first embodiment, to avoid such a problem, the duty ratio D that determines the motor voltage is changed with time to increase the voltage applied to the motor step by step so that the oxide film on the contact surface is broken to enable correct detection of the motor current. Consequently, faults of the motor current detection circuit come to be always detected accurately.

Furthermore, in the first embodiment, faults of the motor current detection circuit can be detected just after the ignition key is turned on while the motor angular velocity ω is almost zero and accordingly, the motor does not rotate. Then an accident that the steering wheel happens to rotate while the motor current detection circuit is checked for faults can be prevented.

[Second Embodiment]

Next, the second embodiment of the present invention will be described.

Figure 8:
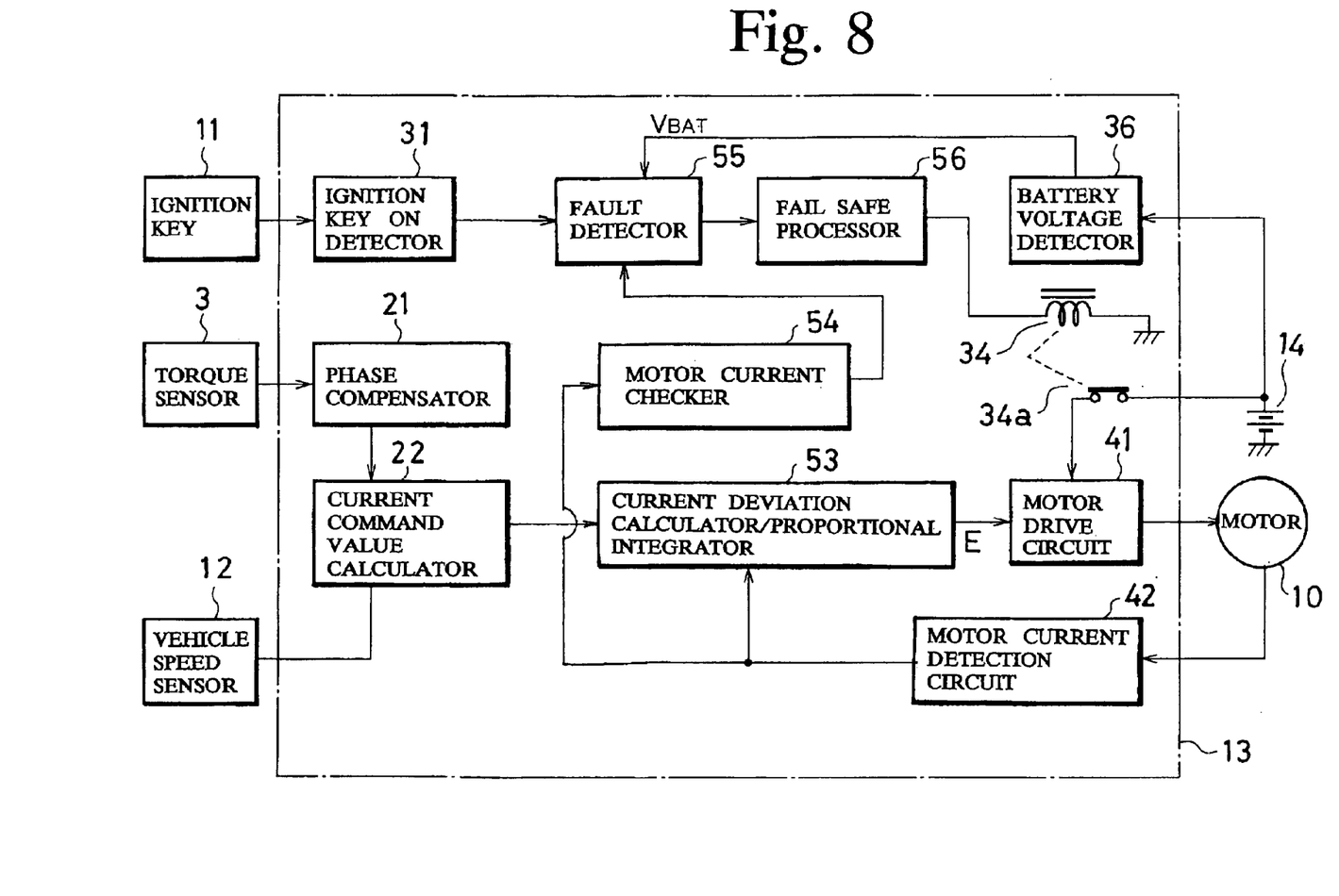
FIG. 8 is a block diagram of an electronic control circuit in the second embodiment of the present invention.

FIG. 8 shows a block diagram of an electronic control circuit 13. In this second embodiment, the same reference numerals will be used for the same elements as those in the first embodiment, avoiding redundant description. In the second embodiment, elements of the electronic control circuit 13 that is mainly configured by a CPU are shown as functions to be executed by a program stored in the CPU. For example, a phase compensator 21 does not denote an independent hardware unit here; it is shown as a function of phase compensation to be executed in the CPU. The electronic control circuit 13 may not be configured by the CPU and each of the above functions may be configured by independent hardware units (electronic circuit), of course.

Hereunder, the functions and operations of the electronic control circuit 13 will be described. A steering torque signal inputted to a torque sensor 3 is subjected to phase compensation by a phase compensator 21 to improve the stability of the steering system, then inputted to a current command value calculator 22. A vehicle speed detected by a vehicle speed sensor 12 is also inputted to the current command value calculator 22. The current command value calculator 22 calculates a current command value I with use of a predetermined expression based on a torque signal and a vehicle speed signal inputted as described above. The current command value I is a target control value of the current to be supplied to a motor 10.

A current deviation calculator/proportional integrator 53 is a calculating element that calculates a difference Δi between the current command value I output from the current command value calculator 22 and the actual motor current value i detected by the motor current detection circuit 42, and perform a proportional integration (PI operation) according to the difference Δi, thereby outputting a current control value E for controlling the motor 10.

Next, the operation of the current deviation calculator/proportional integrator 53 will be described. While the motor current value i is detected normally, the difference value Δi becomes approximately zero. The current control value E output from the current deviation calculator/proportional integrator 53 thus becomes approximately equal to the current command value I, and the motor 11 is driven by the fed-back control so that the difference value Δi becomes zero.

While the motor current value i is not detected normally, the difference value Δi between the current command value I and the detected actual motor current value i is large. Consequently, the current control value E increases step by step as a result of the proportional integration (PI operation) performed by the difference value Δi between the current command value I and the detected actual motor current value i. Thus, the voltage v applied to the motor 10 between terminals rises step by step.

When the contact surface between the commutator and the brush of the motor 10 is covered by an oxide film, the initial motor current value i is detected only slightly. Then, the slightly detected current value i is fed back to the current deviation calculator/proportional integrator 53. As the difference values Δi are integrated, the current control value E increases step by step, thereby the motor applied voltage V rises step by step.

When the motor applied voltage V exceeds a certain value, the oxide film on the contact surface is broken. A large current thus comes to flow in the motor suddenly in correspondence to the high voltage V applied according to the increased current control value E. After this, however, the motor current value i comes to be detected normally, thereby the motor is driven by the fed back control so that the difference value Δi between the current command value I and the detected actual motor current value i becomes zero.

The motor current checker 54 determines whether or not the motor current value i detected by the motor current detection circuit 42 is within the preset limit value. When the result is NO (not within the limit value), the motor current checker 54 outputs a fault signal. The signal denotes that a fault is detected in the motor current detection circuit 42. When the result is YES (within the limit value), the motor current checker 54 outputs a no-fault signal.

The fault detector 55 determines whether the motor current detection circuit 42 is faults or not and output a fault determination signal based on a plurality of signals output from the motor current checker 54, a signal output from the ignition key ON detector 31 that detects the on-state of the ignition key, and a signal output from the battery voltage detector 36 that determines whether battery voltage is normal or not.

The fail-safe processor 56 actuates a relay circuit 34 according to the fault determination signal output from the fault detector 55 to shut off the power supply to the motor 10. The fault determination and the fail-safe processing will be described in detail later.

The configuration of the motor drive circuit 41 is the same as that in the first embodiment. The description will thus be omitted here.

The electronic control circuit described above can assist the steering power optimally according to the running state of the subject motor vehicle, since a large current command value I is set when the detected steering torque is large and the detected vehicle speed is zero or low and a small current command value I is set when the detected steering torque is small and the detected vehicle speed is high.

Next, a description will be made for how a fault in the motor current detection circuit 42 will be determined and how a fail-safe processing is performed based on the detection result.

At first, the principles of the fault determination and the fail-safe processing will be described. When the ignition key is turned on to apply a voltage V to the motor 10, a relationship as shown in the following expression (1) is established between the voltage V between motor terminals and the motor current i.

$$V = L \cdot di/dt + Ri + k_T \omega \tag{1}$$

Here, the $k_T$ denotes a counter-electromotive force constant of the motor and the $\omega$ denotes an angular velocity of the motor. The L denotes an inductance of the motor and the R denotes a resistance between motor terminals.

The mechanical time constant Tm of the motor is obtained by dividing the inertia moment J of the motor by the viscosity resistance B of the motor and represented as Tm=J/B. The electrical time constant Te of the motor is obtained by dividing the inductance L of the motor by the resistance R of the motor and represented as Te=L/R.

Next, a description will be made for the transient characteristics of the motor current i and the motor angular velocity $\omega$, as well as a timing for sampling the motor current when the time T is set smaller enough than the mechanical time constant Tm of the motor and larger enough then the electrical time constant Te of the motor (Te<<T<<Tm) and a voltage V is applied to the motor just for a time between the initial state and the time T with reference to FIG. 4(*a*) and FIG. 4(*b*) that are also referred to in the first embodiment.

FIG. 4(*a*) shows a relationship between the voltage V applied to the motor and the application time T. A certain voltage V0 is applied to the motor until the time T0 before the motor current sampling begins. After the sampling begins, the voltage V increases with time step by step.

FIG. 4(*b*) shows a relationship between a motor current and a current application time. In the normal state, that is, when no oxide film is formed on the contact surface between the commutator and the brush of the motor, the motor current rises quickly (electrical time constant Te of the motor<<applying time T of the voltage V) in response to the voltage V applied to the motor, thereby a constant current i flows in the motor.

FIG. 4(*c*) shows a relationship between an angular velocity $\omega$ of the motor and an application time. As shown in FIG. 4(*c*), the mechanical time constant Tm of the motor is large and the angular velocity of the motor is almost zero, that is, the motor does not rotate for the time T in which the voltage V is applied to the motor. In this connection, when the voltage to be applied to the motor is determined so that the estimated motor current "is" is set lower than the value corresponding to the static friction torque of the steering mechanism, the condition that the motor does not rotate unexpectedly is satisfied.

FIG. 4(*d*) shows a timing for sampling the motor current i. As shown in FIG. 4(*d*), the sampling begins at T0 after the voltage V is applied to the motor. The Ts denotes a sampling time.

As described above, the motor current detection circuit 42 fault determination is done by sampling the motor current value i by a plurality of times just after the ignition key is turned on.

Hereinafter, a description will be made for how a fault in the motor current detection circuit 42 of the present invention is determined, as well as for the configuration and operation of the fail-safe processing based on the fault determination with reference to FIG. 8.

The motor current detection circuit 42 might fail in the detection of the motor current value i in the following two cases. In one case, the motor current does not flow or flows only slightly due to the disturbance by the oxide film formed on the contact surface between the commutator and the brush of the motor while the motor current detection circuit 42 is normal in operation. In the other case, the motor current detection circuit 42 itself is defective.

To avoid such wrong fault detection, the present invention enables the motor current value i to be detected after the oxide film on the contact surface is broken, thereby the fault of the motor current detection circuit 42 itself is detected accurately.

When the ignition key 11 is turned on, the voltage V is applied to the motor only for a predetermined time T preset in a timer TM (not shown). The on-state of the ignition key 11 is detected by the ignition key ON detector 31 and the detected signal is inputted to the fault detector 55. The fault detector 55 also receives a battery voltage $V_{BAT}$ detected by the battery voltage detector 36.

At the time of the detection of fault of the motor current detection circuit 42, no steering torque is generated and the vehicle speed is zero. Therefore, the motor is not driven to generate an assist torque. Consequently, a predetermined current command value I for fault detection is output from the current command value calculator 22 so as to apply the voltage V to the motor 10.

On the other hand, sampling of the motor current value i is started after predetermined time T0 (T0<T) preset in the timer TM (not shown) is up. The sampling continues only for the predetermined time Ts preset in the timer TM, as shown in FIG. 4(*d*).

As described above, the current deviation calculator/proportional integrator 53 calculates the difference $\Delta i$ between the current command value I and the detected actual motor current value i and performs a proportional integration (PI operation) according to the difference $\Delta i$, thereby outputting a current control value E for controlling the motor 10. When the contact surface between the commutator and the brush of the motor 10 is covered by an oxide film, the difference value $\Delta i$ is large and the current command value I increases, thereby the current control value E increases step by step. Consequently, the motor applied voltage V also rises step by step. When the motor applied voltage V exceeds a certain value, the oxide film is broken, thereby the normal current flows in the motor. The motor current i is thus detected.

The above processings are always performed in the current deviation calculator/proportional integrator 53 regardless of whether an oxide film is formed on the contact surface or not, the motor current detection circuit 42 can detect the motor current value i free from the disturbance by the oxide film.

In the above processings, a very large current value i is detected at a moment when the oxide film insulation is broken due to the motor applied voltage V that increases step by step. At the next sampling time, however, the motor current value i is detected normally. Therefore, the normal motor current value i is detected in a plurality of sampling operations. Concretely, even when the detected motor current is not within the limit value at a sampling time, it cannot be determined that the motor current detection circuit 42 is defective. Otherwise, the detection might be determined wrongly.

When the detected motor current value is not within the predetermined limit value even in a plurality of sampling operations, it is determined that the motor current detection circuit 42 is defective, since no oxide film is formed on the contact surface in this case. It is also possible to determine that the motor current detector 42 is defective when the detected current value that is not within the predetermined limit value is detected continuously in a specified number of sampling operations.

Furthermore, because the voltage V applied to the motor rises step by step in time series, when the detected motor current corresponding to the voltage V is not within the predetermined value, it may be determined that the motor current detection circuit 42 is defective.

The motor current checker 54 outputs a plurality of fault signals when the motor current value i detected by the motor current detection circuit 42 is not within the predetermined limit value. Each of the signals denotes that a fault has occurred in the motor current detection circuit 42. When the motor current value i is within the limit value, the motor current checker 54 outputs a plurality of no-fault signals. The reason why a plurality of fault/no-fault signals are output at this time is that the motor current value i is sampled by a plurality of times.

The fault detector 55 confirms that those signals are detected through sampling of the motor current value i by a plurality of times in an operation check performed just after the ignition key is turned on based on a plurality of fault or no-fault signals output from the motor current checker 54, the signal output from the ignition key ON detector 32, and the signal output from the battery voltage detector 36.

The fault detector 55 also determines that a fault has occurred in the motor current detecting means and outputs a fault determination signal to the fail-safe processor 56 when a fault signal is detected from every detection result or from a detection result just after no-fault signal is detected in time series.

The fail-safe processor 56 actuates the relay circuit 34 to open the contact 34a according to the received fault determination signal, then shuts off the power supply to the motor 10. The operation of the electric power steering device is thus disabled.

The motor applied voltage V should be limited in maximum by a value corresponding to the mechanical time constant of the motor. This is because otherwise an unexpected rotation of the motor might occur when the motor applied voltage V rises. When the motor applied voltage V is limited by such an upper limit value corresponding to the mechanical time constant of the motor, an accident caused by an unexpected rotation of motor is prevented.

As described above, in the second embodiment of the present invention, the motor current detector circuit is checked for faults just after the ignition key is turned on. And, a motor current command value is set only for a time T whose value is smaller enough than the mechanical time constant Tm of the motor and larger enough than the electrical time constant Te of the motor, thereby the current deviation calculator/proportional integrator 53 calculates a difference between a current command value and a detected motor current value and perform a proportional integration (PI operation) for the result based on the difference $\Delta i$ to output a current control value E for controlling the motor.

When the motor current is not detected normally, the current control value E increases with time through the above integration, thereby the motor applied voltage V rises. A high voltage is thus applied to the motor even when an electrically insulated oxide film is formed on the contact surface between the commutator and the brush of the motor. The insulation of the oxide film is thus broken, thereby the motor current comes to flow normally.

Consequently, the fault detection is done free from the disturbance by the oxide film, so that it is possible to determine that the motor current detector circuit is defective when the detected motor current is not within a predetermined limit value.

Furthermore, it is possible to make fault detection in the motor current detecting means just after the ignition key is turned on even while the motor is not rotated actually. An accident that the steering wheel comes to rotate unexpectedly can thus be avoided during fault detection.

Although only preferred embodiments are specially illustrated and described herein, it will be apparent that many modifications and variations of the present invention are possible in light of the above teachings and within the preview of the appended claims without departing from the spirit and intended scope of the invention.

What is claimed is:

1. An electric power steering device, comprising:
   a steering unit equipped with a motor for providing a steering power assist;
   controlling means for controlling an output of said motor according to at least a signal of a steering torque generated at a steering shaft;
   wherein said controlling means includes:
   motor current command value calculating means for calculating a current command value of a current to be supplied to said motor;
   motor current detecting means for detecting a current that flows in said motor;
   current deviation calculating/proportionally integrating means for calculating each difference between a motor current command value and a detected motor current and integrating calculated difference proportionally for outputting a current control value; and
   fault determining means for determining that said motor current detecting means is defective when said detected motor current is not within a predetermined limit value;
   wherein said controlling means controls so that said motor current command value is set only for a time whose value is larger than said electrical time constant of said motor and smaller than said mechanical time constant of said motor to drive said motor with a voltage to be set based on the current control value output from said current deviation calculating/proportionally integrating means so as to enable said fault determining means to determine a fault of said motor current detecting means.

2. The electric power steering device according to claim 1, wherein said controlling means increases said voltage applied to said motor up to a value that breaks an oxide film formed on a contact surface between a commutator and a brush of said motor.

3. The electric power steering device according to claim 1, wherein said fault determining means determines a fault of said motor current detecting means according to each detection result of said motor current detecting means obtained in a plurality of motor current sampling operations.

4. The electric power steering device according to claim 3, wherein said fault determining means does not determine that said detected motor current detecting means is defective immediately when said detected motor current includes values that are both within said predetermined limit value and not within said predetermined limit value in said motor current sampling results obtained through a plurality of sampling operations, and said fault determining means determines that said motor current detecting means is defective when said detected motor current includes a value not within said predetermined limit value in said sampling results obtained through a plurality of sampling operations, or said detected motor current values include a value not within said predetermined limit value in said sampling results obtained in correspondence with said voltage applied to the motor increased step by step in time series.

5. The electric power steering means according to claim 3, wherein said fault determining means determines that the motor current detecting means is defective when a plurality of motor currents that are not within said limit value are detected consecutively in detection results obtained through a plurality of sampling operations performed by said motor current detecting means.

6. The electric power steering device according to claim 1, wherein said motor applied voltage is limited in maximum by a value corresponding to said mechanical time constant of said motor.

* * * * *

UNITED STATES PATENT AND TRADEMARK OFFICE
CERTIFICATE OF CORRECTION

PATENT NO. : 6,837,331 B2
DATED : January 4, 2005
INVENTOR(S) : Hisayoshi Koiwai et al.

It is certified that error appears in the above-identified patent and that said Letters Patent is hereby corrected as shown below:

Title page,
Item [75], Inventors, delete "Hideaki Kawada, Maebashi (JP);"

Column 14,
Lines 26-27, delete "providing a steering power assist;" and insert -- assisting the steering power of itself; --.

Signed and Sealed this

Twenty-sixth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,837,331 B2
DATED : January 4, 2005
INVENTOR(S) : Hisayoshi Koiwai et al.

It is certified that error appears in the above-identified patent and that said Letters Patent is hereby corrected as shown below:

<u>Column 14,</u>
Lines 26-27, "providing a steering power assist;" (as deleted by Certificate of Correction issued April 26, 2005) is to be reinstated.

Signed and Sealed this

Second Day of August, 2005

JON W. DUDAS
*Director of the United States Patent and Trademark Office*